United States Patent [19]

Awaji et al.

[11] Patent Number: 4,980,416

[45] Date of Patent: Dec. 25, 1990

[54] COMPOSITION OF UNSATURATED ESTER, POLYMERIZABLE CROSSLINKING AGENT AND (METH)ACRYLOYL GROUP-CONTAINING BUTADIENE-ACRYLONITRILE COPOLYMER

[75] Inventors: Toshio Awaji, Kawanishi; Takao Omi, Nishinomiya; Kenichi Ueda, Suita, all of Japan

[73] Assignee: Nippon Shokubai Kagaku Kogyo Co., Ltd., Osaka, Japan

[21] Appl. No.: 292,925

[22] Filed: Jan. 3, 1989

[30] Foreign Application Priority Data

Jan. 6, 1988 [JP] Japan .................................. 63-309

[51] Int. Cl.$^5$ .................. C08L 61/32; C08L 63/10
[52] U.S. Cl. .................................. 525/112; 525/117; 525/118; 525/119; 525/159; 525/161; 525/162; 525/163; 525/286; 525/288; 525/293
[58] Field of Search ............. 525/112, 117, 118, 119, 525/159, 161, 162, 163, 286, 288, 293

[56] References Cited

U.S. PATENT DOCUMENTS 4,837,280  6/1989  Awaji et al. .................. 525/531

FOREIGN PATENT DOCUMENTS 63-12618  1/1988  Japan .
63-99220  4/1988  Japan .

*Primary Examiner*—John C. Bleutge
*Assistant Examiner*—Robert E. L. Sellers, II
*Attorney, Agent, or Firm*—Omri M. Behr

[57] ABSTRACT

A heat-resistant resin composition, comprising (A) 30 to 95% by weight of at least oen unsaturated ester compound selected from the group consisting of (I) unsaturated ester compounds represented by the formula I:

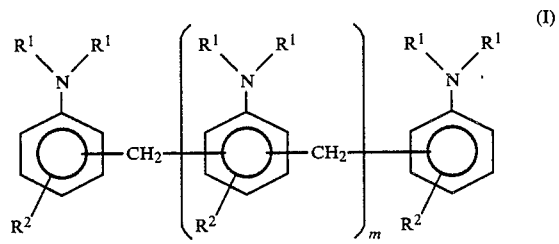

wherein $R^1$s independently stand for one member selected from the class consisting of

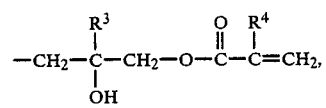

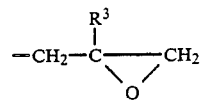

wherein $R^3$ and $R^4$ independently stand for a hydrogen atom or a methyl group, and a hydrogen atom, and at least one $R^1$ stands for

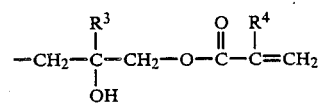

wherein $R^3$ and $R^4$ independently stand for a hydrogen atom or a methyl group, and $R^2$s independently stand for an atom or an organic group selected from the class consisting of a hydrogen atom, halogen atoms, a methoxy group, and alkyl groups of 1 to 5 carbon atoms, and m stands for 0 or an integer in the range of 1 to 10, and (II) unsaturated ester compounds represented by the formula II;

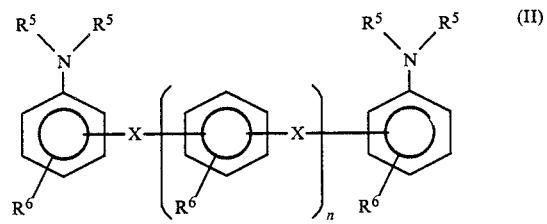

wherein $R^5$s independently stand for one member selected from the class consisting of wherein $R^3$ and $R^4$ independently stand for a hydrogen atom or a methyl group, and a hydrogen atom, at least one $R^5$ stands for

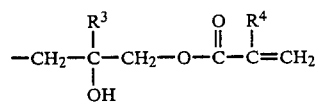

wherein $R^3$ and $R^4$ independently stand for a hydrogen atom or a methyl group, $R^6$s independently stand for an atom or an organic group selected from the class consisting of a hydrogen atom, halogen atoms, a methoxy (Abstract continued on next page.)

group, and alkyl groups of 1 to 5 carbon atoms, n stands for 0 or an integer in the range of 1 to 10, and X stands for a divalent organic group selected from the class consisting of

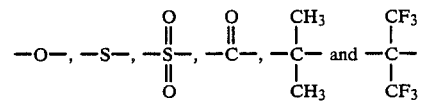

where n is 0 or X's independently stand for a divalent organic group selected from the class consisting of

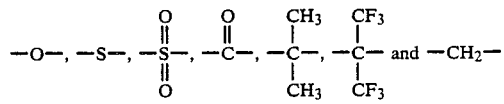

wherein n is an integer in the range of 1 to 10, (B) 70 to 5% by weight of a polymerizable crosslinking agent, and (C) 0.,5 to 15 parts by weight, based on 100 parts by weight of a vinyl ester resin composed of (A) said unsaturated ester compound and (B) said polymerizable crosslinking agent, of a butadiene-acrylonitrile copolymer having at least one (meth)acryloyl group in the molecular unit thereof.

7 Claims, No Drawings

COMPOSITION OF UNSATURATED ESTER, POLYMERIZABLE CROSSLINKING AGENT AND (METH)ACRYLOYL GROUP-CONTAINING BUTADIENE-ACRYLONITRILE COPOLYMER

BACKGROUND OF THE INVENTION

1. Field of the Invention

This invention relates to a heat-resistant resin composition. More particularly, this invention relates to a heat-resistant resin composition excelling in formability as in terms of curability and workability, permitting production of a cured article satisfactory in stability even at elevated temperatures and in mechanical strength, and defying the occurrence of cracks due to thermal expansion and shrinkage during the course of curing.

2. Description of the Prior Art

As resins possessing high stability at elevated temperatures, various heat-resistant resins are cited which are represented by polyimide resins and polyamideimide resins. These heat-resistant resins, however, have important problems regarding formability as because they have high melting points and, therefore, necessitate use of a high temperature and a high pressure for molding, because they require to stand at a high temperature under a high pressure for a long time for curing, and because they require to be used as dissolved in special high-boiling solvents and, therefore, entail a step for the removal of the solvents by a protracted standing at an elevated temperature under application of pressure or under a vacuum. It is, therefore, extremely difficult to produce large formed articles from these heat-resistant resins or to produce formed articles of these resins continuously as by pultrusion molding or extrusion molding.

As resins excelling in formability in terms of curability, workability, etc., radical polymerization type resins such as epoxy (meth)acrylates derived from polyvalent phenol type epoxy resins such as bisphenol type epoxy resins or novolak type epoxy resins and (meth)acrylic acid or unsaturated polyesters have been known in the art. Generally, these resins are widely used in the form of vinyl ester resins or unsaturated polyester resins having incorporated therein a radically polymerizable crosslinking agent such as styrene. These resins, however, are not necessarily quite satisfactory in terms of thermal stability at elevated temperatures. This deficiency in thermal stability constitutes a serious hindrance to the development of applications for the resins. In the circumstances, the desirability of developing a resin excellent in thermal stability has been commanding the recognition of the industry.

An object of this invention, therefore, is to provide a novel heat-resistant resin composition.

Another object of this invention is to provide a heat-resistant resin composition excelling in formability as in terms of curability and workability, permitting production of a cured article satisfactory in stability at elevated temperatures and in mechanical strength, and defying the occurrence of cracks due to thermal expansion and shrinkage during the course of curing.

SUMMARY OF THE INVENTION

The objects described above are accomplished by a heat-resistant resin composition, comprising (A) 30 to 95% by weight of at least one unsaturated ester compound selected from the group consisting of (I) unsaturated ester compounds represented by the formula I:

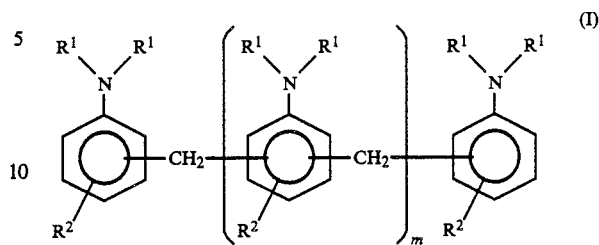

wherein $R^1$s independently stand for one member selected from the class consisting of

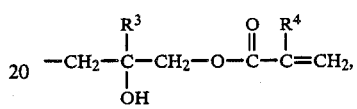

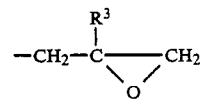

wherein $R^3$ and $R^4$ independently stand for a hydrogen atom or a methyl group, and a hydrogen atom, and at least one $R^1$ stands for

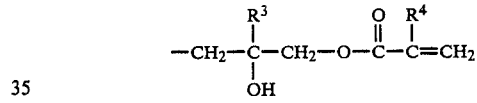

wherein $R^3$ and $R^4$ independently stand for a hydrogen atom or a methyl group, and $R^2$s independently stand for an atom or an organic group selected from the class consisting of a hydrogen atom, halogen atoms, a methoxy group, and alkyl groups of 1 to 5 carbon atoms, and m stands for 0 or an integer in the range of 1 to 10, and (II) unsaturated ester compounds represented by the formula II:

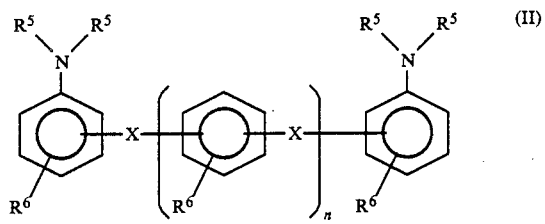

wherein $R^5$s independently stand for one member selected from the class consisting of

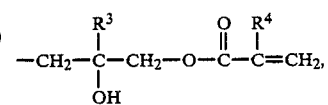

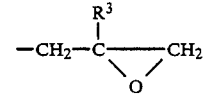

wherein $R^3$ and $R^4$ independently stand for a hydrogen atom or a methyl group, and a hydrogen atom, at least one $R^5$ stands for

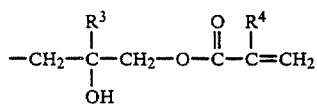

wherein $R^3$ and $R^4$ independently stand for a hydrogen atom or a methyl group, $R^6$s independently stand for an atom or an organic group selected from the class consisting of a hydrogen atom, halogen atoms, a methoxy group, and alkyl groups of 1 to 5 carbon atoms, n stands for 0 or an integer in the range of 1 to 10, and X stands for a divalent organic group selected from the class consisting of

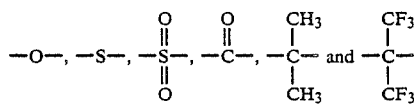

where n is 0 or X's independently stand for a divalent organic group selected from the class consisting of

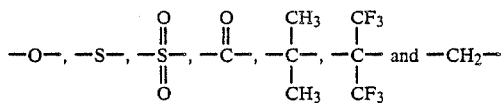

integer in the range of 1 to 10, (B) 70 to 5% by weight of a polymerizable crosslinking agent, and (C) 0.5 to 15 parts by weight, based on 100 parts by weight of a vinyl ester resin composed of (A) the unsaturated ester compound and (B) the polymerizable crosslinking agent, of a butadiene-acrylonitrile copolymer having at least one (meth)acryloyl group in the molecular unit thereof.

Generally, when resin compositions are used in producing cast articles formed solely of resin by high temperature curing or composite materials by a method of resin transfer molding which is liable to form an article having a relatively small reinforcing material content and suffer from lack of uniformity of the distribution of reinforcing material, the produced shaped articles sustain cracks in the portions of high resin content owing to the volume shrinkage caused during the course of curing or the local difference of thermal expansion coefficient. Even in such case, by use of the resin composition of the present invention, an article free from generation of crack and having a good strength and appearance can be obtained.

EXPLANATION OF PREFERRED EMBODIMENT (I) The unsaturated ester compounds or (II) the unsaturated ester compounds from which (A) the unsaturated ester compound to be used in the present invention is selected are represented by the aforementioned formulas I or II. The unsaturated ester compound can be produced by either of the following methods, for example.

The first method available for the production comprises in causing either (a) an aromatic polyamine represented by the formula III:

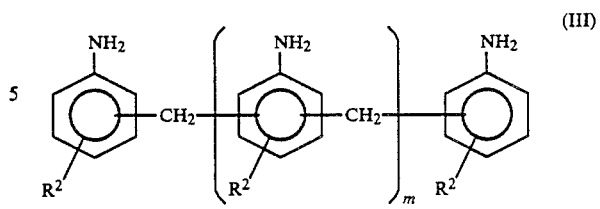

wherein $R^2$s independently stand for an atom or an organic group selected from the class consisting of a hydrogen atom, halogen atoms, a methoxy group, and alkyl groups of 1 to 5 carbon atoms and m stands for 0 or integer in the range of 1 to 10, or (b) an aromatic diamine represented by the formula IV:

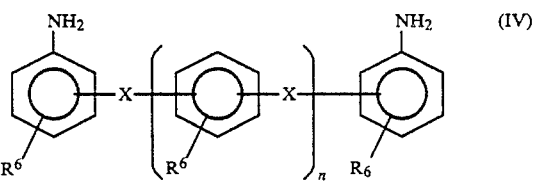

wherein $R^6$s independently stand for an atom or an organic group selected from the class consisting of a hydrogen atom, halogen atoms, a methoxy group, and alkyl groups of 1 to 5 carbon atoms, n stands for 0 or an integer in the range of 1 to 10, and X stands for a divalent organic group selected from the class consisting of

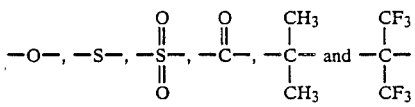

wherein is O or X' independently stand for a divalent organic group selected from the class consisting of

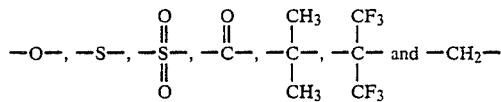

where n is an integer in the range of 1 to 10, to react with (c) a compound having an epoxy group and a radically polymerizable unsaturated bond in the molecular unit thereof and represented by the formula V:

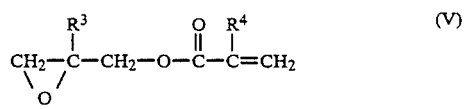

wherein $R^3$ and $R^4$ independently stand for a hydrogen atom or a methyl group.

(a) The aromatic polyamine is represented by the aforementioned formula III and can be obtained by neutralizing an aniline derivative with hydrochloric acid thereby preparing a hydrochloride aniline derivative solution and causing formaldehyde to react with the hydrochloride aniline derivative solution in a ratio such that the proportion of formaldehyde falls in the range of 0.25 to 1.0 mol per mol of the aniline derivative. Examples of the aniline derivative include aniline, p-(m- or o-)chloroaniline, p-(m- or o-)toluidine, p-(m- or o-)ethylaniline, p-(m- or o-)isopropylaniline, p-(m- or o-)n-propylaniline, and p-(m- or o-)methoxyaniline. These aniline derivatives may be used either singly or jointly in the form of a mixture of two or more members. The poly(phenylenemethylene)polyamine to be obtained by the reaction of aniline with formaldehyde is now produced commercially as a raw material for polyurethane. The commercial products of Mitsui-Toatsu Chemicals Inc. marketed under product codes of MDA-220 and MDA-150, for example, may be used in their unmodified form as (a) the aromatic polyamine.

(b) The aromatic diamine is represented by the aforementioned formula IV. Examples of this aromatic diamine include 4,4'-diaminodiphenyl sulfide, 4,4'-diaminodiphenyl sulfone, 3,3'-diaminodiphenyl sulfone, 3,4'-dialninodiphenyl ether, 4,4'-diaminodiphenyl ether, 2,2-bis(4-aminophenyl)propane, 2,2-bis(4-aminophenyl)hexafluoropropane, 1,3-bis(4-aminophenoxy)-benzene, 1,4-bis(4-aminophenoxy)benzene, 1,3-bis(3-aminophenoxy)-benzene, 2,2-bis[4-(4-aminophenoxy)-phenyl]propane, bis[4-(4-aminophenoxy)phenyl]sulfone, 1-(p-aminobenzoyl)-4-(p-aminobenzyl)benzene, 1-(p-aminobenzoyl)-4-(m-aminotenzyl)benzene, 1-(m-aminobenzoyl)-4-(p-aminotenzyl)benzene, 1-(m-aminobenzoyl)-4-(m-aminotenzyl)-benzene, 1,4-bis(m-aminobenzoyl) benzene, 1,4-bis(p-aminobenzoyl)-benzene, 1,3-bis(m-aminobenzyl) benzene, 4,4'-bis(m-aminobenzoyl)diphenyl methane, 4,4'-bis(p-aminobenzoyl) diphenyl methane, and 4,4'-bis(m-aminobenzyl) diphenyl methane and the foregoing compounds having the aromatic hydrogen thereof substituted with a halogen atom, a methoxy group, or an alkyl group of 1 to 5 carbon atoms. These aromatic diamines may be used either singly or jointly in the form of two or more members.

(c) The compound is represented by the aforementioned formula V and contains an epoxy group and a radically polymerizable unsaturated bond. Examples of this compound include glycidyl methacrylate, glycidyl acrylate, 2-methylglycidyl mathacrylate, and 2-methylglycidyl acrylate. These compounds may be used either singly or jointly in the form of a mixture of two or more members.

The production of (I) the unsaturated ester compound or (II) the unsaturated ester compound by the ring-opening addition of (c) the compound to either (a) the aromatic polyamine or (b) the aromatic diamine is effected, for example, by mixing (c) the compound with either (a) the aromatic polyamine or (b) the aromatic diamine in a ratio such that the proportion of (c) the compound falls in the range of 0.2 to 1.5 equivalent weights, preferably 0.3 to 1.0 equivalent weight, per equivalent weight of the hydrogen atom directly bonded to the nitrogen atom contained in (a) the aromatic polyamine or (b) the aromatic diamine and heating the resultant mixture in an inert solvent or in the absence of a solvent at a temperature in the range of 30° to 150° C., preferably 50° to 130° C., to induce a reaction desirably in the presence of air. For the purpose of preventing the reaction mixture from inducing gelation due to polymerization, it is desirable to use in the reaction system a ccnventional polymerization inhibitor such as, for example, at least one member selected from the group consisting of hydroquinones like methyl hydroquinone and hydroquinone and benzoquinones like p-benzoquinone and p-toluquinone.

In the reaction, a ring-opening addition catalyst may be used for the purpose of decreasing the reaction time. The ring-opening addition catalysts available for the reaction include water; alcohols such as methyl alcohol, ethyl alcohol, and isopropyl alcohol; phenols such as phenol and t-butyl catechol; organic acids such as salicylic acid, citric acid, and malic acid; organic acid salts such as zinc salicylate and tin octylate; and boron trifluoride-monoethanolamine complex, for example.

As the inert solvent, toluene, xylene, or dimethyl formamide may be used, for example. Ethyl alcohol or acetic acid serving primarily as a catalyst may be used concurrently as a reaction medium. The solvent is required to be removed from the reaction product at the end of the reaction. Particularly when a polymerizable crosslinking agent which is liquid at room temperature is additionally used in the final composition, therefore, it is advantageous to use this polymerizable crosslinking agent as a solvent in the reaction.

The second method available for the production comprises in causing chemical addition of (d) an epihalohydrin represented by the formula VI:

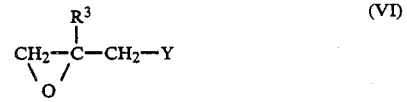

wherein $R^3$ stands for a hydrogen atom or a methyl group and Y stands for a halogen atom to (a) the aromatic polyamine represented by the aforementioned formula III or (b) the aromatic diamine represented by the aforementioned formula IV thereby preparing N-halohydrin as an intermediate, then subjecting this N-halohydrin to dehydrohalogenation with an alkali for impartation thereto of a glycidyl group thereby preparing an epoxy compound (hereinafter referred to as "epoxy compound (e)"), and further causing ring-opening chemical addition of acrylic acid and/or methacrylic acid to (e) the epoxy compound.

(d) The epihalohydrin is a compound which is represented by the aforementioned formula. Examples of the epihalohydrin are epichlorohydrin, epibromohydrin, epiiodohydrin, β-methyl epichlorohydrin, β-methyl epibromohydrin, and β-methyl epiiodohydrin.

The production of (e) the epoxy compound by the reaction of either (a) the aromatic polyamine or (b) the aromatic diamine with (d) the epihalohydrin can be accomplished, for example, by mixing (d) the epihalohydrin with either (a) the aromatic polyamine or (b) the aromatic diamine in a ratio such that the proportion of (d) the epihalohydrin falls in the range of 1 to 5 equivalent weights, preferably 2 to 3 equivalent weights, per equivalent weight of the hydrogen atom directly bonded to the nitrogen atom in (a) the aromatic polyamine or (b) the aromatic diamine, heating the resultant mixture at a temperature in the range of 40° to 100° C. for a period in the range of 5 to 30 hours, preferably at a temperature in the range of 70° to 90° C. for a period in the range of 7 to 15 hours, thereby inducing chemical addition, and then gradually adding the hydroxide of an alkali metal to the resultant reaction product and heat-treating the resultant mixture at a temperature of no more than 70° C. for a period in the range of 2 to 10 hours for removal of hydrochloric acid.

A commercial product of Ciba-Geigy marketed under trademark designation of "Araldite MY-720" or a commercial product of Toto Kasei K.K. marketed under product code of "YH-434" may be used in this invention as (e) the epoxy compound described above.

The production of (I) the unsaturated ester compound or (II) the unsaturated ester compound by the reaction of (e) the epoxy compound with acrylic acid and/or methacrylic acid may be accomplished, for example, by mixing (e) the epoxy compound with acrylic acid and/or methacrylic acid in a ratio such that the proportion of the acrylic acid and/or methacrylic acid falls in the range of 0.3 to 1.2 mols, preferably 0.5 to 1.1 mols, per mol of the epoxy group contained in (e) the epoxy compound, heating the resultant mixture in an inert solvent or in the absence of a solvent at a temperature in the range of 60° to 150° C., preferably 70° to 130° C., thereby inducing reaction preferably in the presence of air. For the purpose of preventing the reaction mixture from gelation due to polymerization, it is desirable to use a conventional polymerization inhibitor. Examples of the polymerization inhibitor include hydroquinones such as methyl hydroquinone and hydroquinone and benzoquinones such as p-benzoquinone and p-toluquinone. The amount of the polymerization inhibitor to be used is desired to be in the range of 0.001 to 0.5 % by weight, preferably 0.005 to 0.2 % by weight.

For the purpose of decreasing the reaction time, it is desirable to use an esterification catalyst in this reaction. The esterification catalysts available for this purpose include tertiary amines such as N,N-dimethylaniline, pyridine, and triethylamine and hydrochlorides and bromates thereof; quaternary ammonium salts such as tetramethyl ammonium chloride and triethylbenzyl ammonium chloride, sulfonic acids such as paratoluenesulfonic acid; sulfoxides such as dimethyl sulfoxide and methyl sulfoxide; sulfonium salts such as trimethyl sulfonium chloride and dimethyl sulfonium chloride; phosphines such as trimethyl phosphine and tri-n-butyl phosphine; and metal halides such as lithium chloride, lithium bromide, stannous chloride, and zinc chloride, for example. The amount of the esterification catalyst to be used for this purpose is in the range of 0.01 to 2.0% by weight, preferably 0.03 to 1.0 % by weight.

Toluene or xylene may be used as the inert solvent, for example. This solvent, however, is required to be removed from the reaction product at the end of the reaction. Particularly where a polymerizable crosslinking agent which is in a liquid state at normal room temperature is additionally used in the final composition, therefore, this polymerizable crosslinking agent is desired to be used concurrently as a solvent in the reaction.

The polymerizable crosslinking agents available for this invention include those conventional compounds for unsaturated polyester resins and vinyl ester resins, specifically styrene derivatives such as styrene, alpha-methyl styrere, p-methyl styrene, t-butyl styrene, vinyl toluene, and divinyl benzene; (meth)acrylic ester monomers such as methyl (meth)acrylates, 2-ethylhexyl (meth)acrylates, cyclohexyl (meth)acrylates, tricyclodecenyl (meth)acrylates, and 2-hydroxyethyl (meth)acrylates; (meth)acrylates of polyhydric alcohols such as trimethylolpropane tri(meth)acrylates, diethylene glycol di(meth)acrylates, 1,4-butanediol di(meth)acrylates, tris(2-hydroxyethyl)isocyanuric (meth)acrylic ester, and di(meth)acrylates of 2,2-bis[4-(2-hydroxyethoxy)phenyl]propane; and allyl compounds such as diallyl phthalate, diallyl isophthalate, diallyl terephthalate, and triallyl isocyanurate, and triallyl cyanurate, for example. These polymerizable crosslinking agents may be used either singly or jointly in the form of a mixture of two or more members.

Particularly from the standpoint of the copolymerizability or compatibility with (A) the unsaturated ester compound or (C) the butadiene-acrylonitrile copolymer having at least one acryloyl group and/or methacryloyl group in the molecular unit thereof, the polymerizable crosslinking agent (B) is desired to have as an essential component thereof a styrene compound represented by the formula VII:

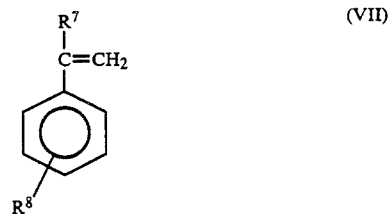

wherein $R^7$ stands for a hydrogen atom or a methyl group and $R^8$ stands for a hydrogen atom or an alkyl group of 1 to 5 carbon atoms. When an alkyl group-substituted styrene is used as a main component for the polymerizable crosslinking agent (B), the cured article produced from the resin composition exhibits outstanding stability at high temperatures. On account of the availability, vinyl toluene and p-methyl styrene prove to be particularly advantageous.

In the production of the vinyl ester resin as a basis for the construction cf the resin composition of this invention, the ratio of the amount of (A) the unsaturated ester compound to that of (B) the polymerizable crosslinking agent is such that the proportion of the former is in the range of 30 to 95% by weight, preferably 45 to 80% by weight, and that of the latter in the range of 70 to 5% by weight, preferably 55 to 20% by weight. If the amount of (A) the unsaturated ester compound to be used is less than 30% by weight or the amount of (B) the polymerizable crosslinking agent to be used exceeds 70% by weight, the produced resin composition is not highly satisfactory in mechanical strength and heat-resistance. If the amount of (A) the unsaturated ester compound to be used exceeds 95% by weight or the amount of (B) the polymerizable crosslinking agent to be used is less than 5% by weight, the produced resin composition is inferior in formability such as curability and workability and the cured article is deficient in mechanical strength and heat-resistance.

As (C) the butadiane-acrylonitrile copolymer having at least one acryloyl and/or methacryloyl group in the molecular unit thereof and used in this invention (hereinafter referred to simply as "(C) (meth)acryloyl group-containing butadiene-acrylonitrile copolymer"), butadiene-acrylonitrile copolymers meeting the description given above and coming in various forms are available. The reaction products between carboxyl group- and amino group-containing butadiene-acrylonitrile copolymers and compounds having an epoxy group and (meth)acryloyl group in the molecular unit thereof, the butadiene-acrylonitrile copolymer-modified vinyl esters obtained by allowing butadiene-acrylonitrile copolymers containing a carboxyl group and an amino group to take the place of part of (meth)acrylic acid in the reactor between the (meth)acrylic acid and epoxy compounds having at least two epoxy groups in the molecular unit thereof, and the reaction products between maleated butadiene-acrylonitrile copolyers and compounds having a (meth)acryloyl group and a hydroxyl group in the molecular unit thereof may be mentioned, for example. These are not the only butadiene-acrylonitrile copolymers usable. Other butadiene-acrylonitrile copolymers are usable when they fulfill the requirement that they should contain in the molecular unit thereof at least one acryloyl group and/or methacryloyl group copolymerizable with (A)the unsaturated ester compound and (B) the polymerizable crosslinking agent.

Particularly when the butadiene-acrylonitrile copolymer-modified unsaturated ester compound obtained by the reaction of a butadiene-acrylonitrile copolymer containing a carboxyl group and/or an amino group to take the place of part of the acrylic acid and/or methacrylic acid in the reaction of the acrylic acid and/or methacrylic acid with (e) the epoxy compound, or the butadiene-acrylonitrile copolymer-modified unsaturated ester compound obtained by causing (I) the unsaturated ester compound and/or (II) the unsaturated ester compound to react with a maleated (butadiene-acrylonitrile copolymer) thereby effecting ring-opening chemical addition of the hydroxyl group and/or amino group contained in (I) the unsaturated ester compound and/or (II) the unsaturated ester compound to the succinic anhydride group contained in the maleated (butadiene-acrylonitrile copolymer) is used as (C) the (meth)acryloyl group-containing butadiene-acrylonitrile copolymer, there is derived a great advantage that (C) the (meth)acryloyl group-containing butadiene-acrylonitrile copolymer excels in compatibility with (A) the unsaturated ester compound and (B) the polymerizable crosslinking agent and the heat-resistant resin composition to be produced exhibits a highly satisfactory shelf life with stability enough to preclude phase separation for a long time.

If a butadiene-acrylonitrile copolymer containing neither acryloyl group nor methacryloyl group is used in place of (C) the (meth)acryloyl group-containing butadiene-acrylonitrile copolymer, the butadiene-acrylonitrile copolymer is ununiformly dispersed in the cured article made of the produced resin composition. The cured article, therefore, acquires no homogeneous mechanical strength and exhibits notably inferior stability at high temperatures.

The amount of (C) the (meth)acryloyl group-containing butadiene-acrylonitrile copolymer to be used is in the range of 0.5 to 15 parts by weight, preferably 1 to 10 parts by weight, as butadiene-acrylonitrile copolymer based on 100 parts by weight of the vinyl ester resin composed of (A) unsaturated ester compound and (B) the polymerizable crosslinking agent.

If the amount of (C) the (meth)acryloyl group-containing butadiene-acrylonitrile copolymer is less than 0.5 part by weight, this copolymer is not fully effective in curbing the occurrence of cracks while the formed article of the produced resin composition is in process of curing. Conversely, if this amount exceeds 15 parts by weight, there arises a disadvantage that the article to be obtained by curing the produced resin composition acquired inferior mechanical strength.

The curing of the resin composition of this invention can be attained by the method of photopolymerization using a photosensitizer, the method of thermal polymerizatior using a polymerization initiator such as an or(anic peroxide or an azo compound, or the method of room temperature polymerization using an organic peroxide and an accelerator.

The photosensitizers usable for the photopolymerization method include numerous conventional compounds represented by such carbonyl compounds as benzoin, benzoin methyl ether, benzoin ethyl ether, benzoin propyl ether, benzoin isobutyl ether, and benzophenone and such sulfur compounds as diphenyl disulfide and tetramethyl thiuram disulfide, for example. These photosensitizers may be used either singly or jointly in the form of a mixture of two or more members or in combination with any of the organic peroxides to be mentioned below. The amount of the photosensitizer to be used is in the range of 0.01 to 4% by weight, preferably 0.05 to 3% by weight based on the amount of the resin composition.

The organic peroxides usable herein include t-butyl peroxybenzoate, t-butyl peroxy-2-ethylhexanoate, benzoyl peroxide, cyclohexanone peroxide, methylethyl ketone peroxide, and bis-4-t-butyl cyclohexyl peroxydicarbonate, for example. The azo compounds usable herein include azobisisobutylonitrile, for example. These compounds may be used either singly or jointly in the form of a mixture of two or more members. The amount of the polymerization initiator to be used is in the range of 0.1 to 4.0% by weight, preferably 0.3 to 3.0% by weight, based on the amount of the resin composition.

The heating temperature is generally in the range of 40° to 180° C., preferably 60° to 160° C.

The accelerators usable herein include polyvalent metal salts such as cobalt, iron, and manganese salts of octylic acid and naphthenic acid and organic amines such as dimethyl aniline, diethyl aniline, p-toluidine, and ethanol amine. These accelerators may be used either singly or jointly in the form of a mixture of two or more members. The amount of the accelerator to be used is in the range of 0.001 to 3% by weight, preferably 0.005 to 2% by weight, based on the amount of the resin composition.

The resin composition of the present invention, when necessary, may incorporate therein such reinforcing materials as glass fibers, carbon fibers, aramid fibers, and whiskers, powdery reinforcing materials, fillers, thickeners, silane coupling agents such as methacryl functional silane coupling agents, mold release agents such as calcium stearate and paraffin, pigments and coloring agents, flame-retardants, and flame-resistant agents, to produce composite resin compositions.

The resin composition of the present invention possesses an excellent curing property such that it is cured very quickly by the method of photopolymerization and the method of thermal polymerization and it can be cured even at normal room temperature. The shaped article obtained by curing the resin composition exhibits outstanding thermal stability at high temperatures and possesses a high heat distortion point. Even when the resin composition is cured by itself at elevated temperatures or when it is formed by such a method as the resin transfer molding method which is liable to limit the reinforcing material content to relatively low level and suffer from uneven distribution of the reinforcing material content, the volume shrinkage during the course of curing and the occurrence of cracks due to local difference of thermal expansion coefficient are curbed notably. Further, the resin composition of the present invention permits production of a cured article which manifests a quality well balanced among water-resistance, chemical resistance, and mechanical strength.

Owing to the advantageous features mentioned above, the resin composition of the present invention is used favorably as a resin for heat-resistant formed articles produced by the resin transfer molding method or the resin injection molding method, as a resin for heat-resistant cast articles, as a resin for large formed articles of high stability at elevated temperatures produced by the contact pressure molding method or the filament winding method, as a resin for formed articles of outstanding stability at elevated temperatures produced by the continuous molding method of high productivity such as the extrusion molding method, the protrusion molding method, or the continuous lamination method, and as a resin for composite materials produced by the sheet molding compound (SMC) method or the bulk molding compound (BMC) method which has a short molding cycle.

The applications found for the resin composition of the present invention include such corrosion-resistant articles as tanks, pipes, ducts, and scrubbers, such automobile parts as leaf springs, drive shafts, and wheels, such electric and electronic parts as primed circuit boards and various insulating parts, coating material for optical fiber cables, materials for casting electric and electronic parts, and coating materials and inks, for example. These are not the only applications that are found for the resin composition of this invention.

Now, the present invention will be described more specifically below with reference to working examples. It should be noted, however, that this invention is not limited to these examples. Wherever parts and percents are mentioned hereinafter, they are invariably based on weight.

REFERENTIAL EXAMPLE 1

In a reaction vessel provided with a thermometer, a reflux condenser, an air inlet tube, and a stirrer, 34 parts of methacrylic acid, 90 parts of N-tetraglycidyl-diaminodiphenyl methane possessing an epoxy equivalent weight of 125 (product of Ciba-Geigy and marketed under trademark designation of "Araldite MY720"), 350 parts of a carboxyl group-terminating butadiene-acrylonitrile copolymer possessing a molecular weight of 3,500 and a carboxyl group content of 2.40% (product of BF Goodrich Corp. marketed under trademark designation of "Hycar CTBN 1300X13"), 255 parts of p-methyl styrene, 1.8 parts of triethylamine, and 0.4 part of hydroquinone were placed and, under a current of air, heated at 115° C. for 5 hours as kept stirred. Consequently, there was obtained a p-methyl styrene solution of a butadiene-acrylnitrile copolymer-modified unsaturated ester compound (having a butadiene-acrylonitrile copolymer content of 47.9%) possessing an acid number of 0. Hereinafter, this p-methyl styrene solution of butadiene-acrylonitrile copolymer-modified unsaturated ester compound will be referred to as "methacryloyl group-containing butadiene-acrylonitrile copolymer solution (1)."

REFERENTIAL EXAMPLE 2

In the same reaction vessel as used in Referential Example 1, 146 parts of methacrylic acid, 250 parts of N-tetraglycidyl diaminodiphenyl methane having an epoxy equivalent weight of 125 (product of Ciba-Geigy marketed under trademark designation of "Araldite MY720"), 100 parts of p-methyl styrene, 1.3 parts of triethyl amine, and 0.3 part of hydroquinone were placed and, under a current of air, heated at 115° C. for 6 hours as kept stirred. Consequently, there was obtained a p-methyl styrene solution of an unsaturated ester having an acid number of 3.0. A vinyl ester resin (1) was obtained by addition of 114 parts of p-methyl styrene to the solution.

REFERENTIAL EXAMPLE 3

In the same reaction vessel as used in Referential Example 1, 128 parts of glycidyl methacrylate, 118 parts of polymethylene polyaniline possessing an amino content of 15.8% (product of Mitsui-Toatsu Chemical Co., Ltd. marketed under product code of "MDA-150"), represented by following formula:

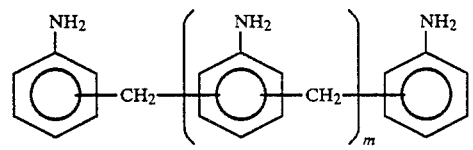

wherein m stands for an average value of 0.8, 150 parts of vinyl toluene, 0.6 part of methyl hydroquinone, and 0.9 part of zinc salicylate were placed and, under a current of air, heated at 110° C. for 8 hours as kept stirred. On analysis of the reaction product by nuclear magnetic resonance absorption spectrometry, it was confirmed that the glycidyl methacrylate was thoroughly used in the reaction. Thus, there was obtained a vinyl toluene solution of an unsaturated ester compound. A vinyl ester resin (2) was obtained by adding 50 parts of vinyl toluene to the solution.

REFERENTIAL EXAMPLE 4

In the same reaction vessel as used in Referential Example 1, 142 parts of 2,2-bis[4-(4-aminophenoxy)-phenyl]propane, 158 parts of glycidyl methacrylate, 160 parts of p-methyl styrene, 0.4 part of methyl hydroqiinone, and 1.0 part of triethyl amine were placed and, under a current of air, heated at 115° C. for 5 hours as kept stirred. On analysis of the reaction product by nuclear magnetic resonance absorption spectrometry, it was confirmed that the glycidyl methacrylate was thoroughly used in the reaction. Consequently, there was obtained a vinyl ester resin (3).

EXAMPLES 1 to 6

Resin compositions (1) to (6) of the present invention were obtained by mixing the vinyl ester resins (1) to (3) obtained in Referential Examples 2 to 4 with the methacryloyl group-containing butadiene-acrylonitrile copolymer solution (1) obtained in Referential Example 1 in varying ratios indicated in Table 1.

TABLE 1

| Example | 1 | 2 | 3 | 4 | 5 | 6 |
| Resin composition | (1) | (2) | (3) | (4) | (5) | (6) |
|---|---|---|---|---|---|---|
| Percentage composition of resin composition (parts) | | | | | | |
| Vinyl ester resin (1) | 94 | 90 | 80 | — | — | — |
| Vinyl ester resin (2) | — | — | — | 90 | 75 | — |
| Vinyl ester resin (3) | — | — | — | — | — | 90 |
| Methacryloyl group-containing butadiene-acrylonirile copolymer solution (1) | 6 | 10 | 20 | 10 | 25 | 10 |
| Butadiene-acrylonitrile | 2.9 | 4.8 | 9.6 | 4.8 | 12.0 | 4.8 |

TABLE 1-continued

| Example | 1 | 2 | 3 | 4 | 5 | 6 |
|---|---|---|---|---|---|---|
| Resin composition | (1) | (2) | (3) | (4) | (5) | (6) |
| copolymer content in resin composition (%) | | | | | | |

CONTROLS 1 to 6

Resin compositions (1) to (6) for comparison were obtained by mixing the vinyl ester resins (1) to (3) obtained in Referential Examples 2 to 4 themselves or with the same carboxyl group-terminating butadiene-acrylonitrile copolymer (product of BF Goodrich Corp. marketed under product code of "Hycar CTBN 1300X13") as used in Referential Example 1 in varying ratios indicated in Table 2.

TABLE 2

| Comparative resin composition | (1) | (2) | (3) | (4) | (5) | (6) |
|---|---|---|---|---|---|---|
| Control | 1 | 2 | 3 | 4 | 5 | 6 |
| Percentage composition of resin composition (parts) | | | | | | |
| Vinyl ester resin (1) | 100 | 90 | — | — | — | — |
| Vinyl ester resin (2) | — | — | 100 | 90 | — | — |
| Vinyl ester resin (3) | — | — | — | — | 100 | 90 |
| Hycar CTBN 1300 × 13 | — | 10 | — | 10 | — | 10 |
| Butadiene-acrylonitrile copolymer content in resin composition (%) | 0 | 10 | 0 | 10 | 0 | 10 |

EXAMPLE 7

The resin compositions (1) to (6) and the resin compositions for comparison (1) to (6) obtained respectively in Examples 1 to 6 and Controls 1 to 6 were thoroughly mixed with 1 part, based on 100 parts of the composition, of t-butyl peroxy-2-ethylhexanoate. The resultant mixtures were placed, in a fixed amount of 30g, in test tubes 18 mm in inside diameter and 180 mm in depth and cured in an oil bath at 100° C. The samples of cast molding article were visually examined for sign of crack and appearance. The results are shown in Table 3.

EXAMPLE 8

The resin compositions (1) to (6) and the resin compositions for comparison (1) to (6) obtained respectively in Examples 1 to 6 and Controls 1 to 6 were thoroughly mixed with 1 part, based on 100 parts of the composition, of t-butyl peroxy-2-ethylhexanoate. Then, 20 cm-square pieces of satin-woven glass cloth (product of Japan Glass Fiber Mfg Co., Ltd. marketed under product code of "YES-2101-N-1") were impregnated with the resultant mixtures. The glass cloth pieces from each sample mixture were piled in 12 plies and pressed under 130 kg/cm² at 120° C. for 3 minutes to obtain a laminate sheet having a glass content of 65±1% and a thickness of 3 mm. The laminates thus obtained were after-cured in an air oven at 200° C. for 1 hour and then tested for thermal stability. The results are shown in Table 3.

The thermal stability was evaluated by using a test piece of given laminate measuring 75 mm×25 mm×3 mm and determining the ratio of decrease of weight by heating and the ratio of bending strength retained after the heating in accordance with the following formulas.

Ratio of decrease of weight by heating (%) =

$$\left\{ 1 - \frac{\begin{array}{c}\text{(Weight of test piece after 500 hours'}\\\text{heating in air at 240° C.)} - \text{(weight of}\\\text{glass fibers)}\end{array}}{\text{(Initial weight of test piece)} - \text{(weight of glass fibers)}} \right\} \times 100$$

The weight of glass fibers was determined by the 500 hours' heating in the air at 240° C. and a subsequent 5 hours' heating at 600° C.

Ratio of bending strength retained (%) =

$$\left\{ \frac{\begin{array}{c}\text{Bending strength after 500 hours' heating}\\\text{in air at 240° C.}\end{array}}{\text{Initial bending strength}} \right\} \times 100$$

The bending strength was determined in accordance with JIS K 6911.

TABLE 3

| Resin composition used for cast molding article or laminate sheet | Resin composition | | | | | |
|---|---|---|---|---|---|---|
| | (1) | (2) | (3) | (4) | (5) | (6) |
| Situation of crack occurrence in cast molded article | no cracking | no cracking | no cracking | no cracking | no cracking | no cracking |
| Appearance of cast molded article | clear | clear | clear | clear | clear | clear |
| Ratio of decrease of weight(%) after 500 hours' heating in air at 240° C. | 7.9 | 8.1 | 9.0 | 8.1 | 8.8 | 7.7 |
| Ratio of bending strength retained (%) after 500 hours' heating in air at 240° C. | 99 | 99 | 96 | 98 | 95 | 98 |

| Resin composition used for cast molding article or laminate sheet | Comparative resin composition | | | | | |
|---|---|---|---|---|---|---|
| | (1) | (2) | (3) | (4) | (5) | (6) |
| Situation of crack occurrence in cast molded article | strikingly cracking | slightly cracking | strikingly cracking | slightly cracking | strikingly cracking | no cracking |
| Appearance of cast molded article | clear | ununiformly opaque | clear | ununiformly opaque | clear | ununiformly opaque |
| Ratio of decrease of weight(%) after 500 hours' | 7.9 | 36.3 | 8.1 | 32.4 | 8.0 | 33.5 |

TABLE 3-continued

| | | | | | | |
|---|---|---|---|---|---|---|
| heating in air at 240° C. | | | | | | |
| Ratio of bending strength retained (%) after 500 hours' heating in air at 240° C. | 98 | 39 | 97 | 45 | 97 | 43 |

REFERENTIAL EXAMPLE 5

In the same reaction vessel as used in Referential Example 1, 350 parts of a carboxyl group-terminating butadiene-acrylonitrile copolymer possessing a molecular weight of 3,500 and a carboxyl group content of 2.40% (product of B.F. Goodrich Corp. marketed under trademark designation of "Hycar CTBN 1300X13?), 29.4 parts of maleic anhydride, and 0.1 part of t-butyl catechol were placed and, under a current of nitrogen, heated at 180° C. for 5 hours as kept stirred. On analysis of the reaction product by nuclear magnetic resonance absorption spectroxtry, it was confirmed that the maleic anhydride was thoroughly used in the reaction. Consequently, there was obtained a maleated (butadiene-acrylonitrile copolymer) (1).

EXAMPLE 9

In the same reaction vessel as used in Referential Example 1, 10 parts of the maleated (butadiene-acrylonitrile copolymer) (1) obtained in Referential Example 5 and 190 parts of the vinyl ester resin (2) obtained in Referertial Example 3 were placed and, under a current of air, heated at 100° C. for 3 hours as kept stirred. At the end of this heating, the reaction product showed no change of acid number in a water-acetone mixed solvent. Consequently, there was obtained a resin composition (7) containing a butadiene-acrylonitrile copolymer-modified unsaturated ester compound.

EXAMPLE 10

In the same reaction vessel as used in Referential Example 1, 20 parts of the maleated (butadiene-acrylonitrile ccpolymer) (1) obtained in Referential Example 5 and 180 parts of the vinyl ester resin (2) obtained in Referential Example 3 were placed and, under a current of air, heated at 100° C. for 4 hours as kept stirred. At the end of this heating, the reaction product showed no change of acid number in a water-acetone mixed solvent. Consequently, there was obtained a resin composition (8) containing a butadiene-acrylonitile copolymer-modified unsaturated ester compound.

EXAMPLE 11

In the same reaction vessel as used in Referential Example 1, 10 parts of the maleated (butadiene-acrylonitrile copolymer) (1) obtained in Referential Example 5 and 190 parts of the vinyl ester resin (3) obtained in Referential Example 4 were placed and, under a current of air, heated at 100° C. for 3 hours as kept stirred. At the end of this heating, the reaction product showed no change of acid number in a water-acetone mixed solvent. Consequently, there was obtained a resin composition (9) containing a butadiene-acrylonitrile copolymer-modified unsaturated ester compound.

EXAMPLE 12

Cast molding articles of the resin compositions (7) to (9) obtained in Example 9 to 11 were visually examined for sign of crack and appearance by following the procedure of Example 7. The results are shown in Table 4.

EXAMPLE 13

Laminate sheet of the resin compositions (7) to (9) obtained in Example 9 to 11 were tested for thermal stability by following the procedure of Example 8. The results are shown in Table 4.

TABLE 4

| Resin composition | 7 | 8 | 9 |
|---|---|---|---|
| Vinyl ester resin (2) (parts by weight) | 95 | 90 | — |
| Vinyl ester resin (3) (parts by weight) | — | — | 95 |
| Maleated (butadiene-acrylonitrile copolymer) used in the reaction (parts by weight) | 5 | 10 | 5 |
| Butadiene-acrylonitrile copolymer content in resin composition by weight) | 4.6 | 9.2 | 4.6 |
| Appearance of cast molding article | clear | clear | clear |
| Ratio of decrease of weight(%) after 500 hours' heating in air at 240° C. | 8.3 | 8.9 | 7.3 |
| Ratio of bending strength retained (%) after 500 hours' heating in air at 240° C. | 97 | 94 | 98 |

What is claimed is:

1. A heat-resistant resin composition, comprising (A) 30 to 95% by weight of at least one unsaturated ester compound selected from the group consisting of (I) unsaturated ester compounds represented by the formula I:

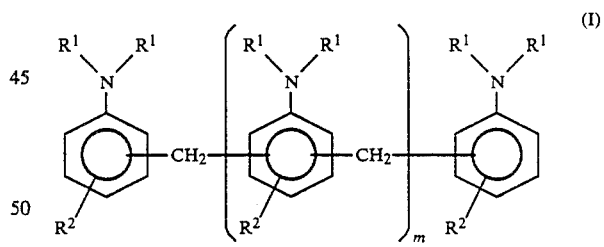

wherein $R^1$s independently stand for one member selected from the group consisting of

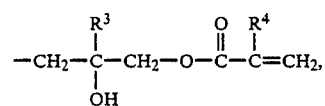

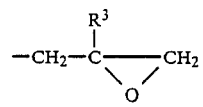

wherein $R^3$ and $R^4$ independently stand for a hydrogen atom or a methyl group, and a hydrogen atom, and at least one $R^1$ stands for

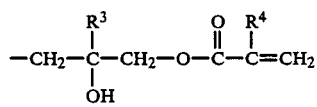

wherein $R^3$ and $R^4$ independently stand for a hydrogen atom or a methyl group, and $R^2$s independent stand for an atom or an organic group selected from the group consisting of a hydrogen atom, halogen atoms, a methoxy group, and alkyl group of 1 to 5 carbon atoms, and m stands for 0 or an integer in the range of 1 to 10, and (II) unsaturated ester compounds represented by the formula II:

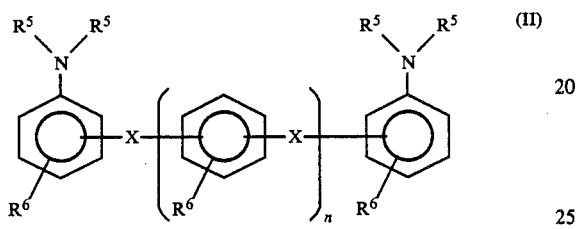

wherein $R^5$s independently stand for one member selected from the group consisting of

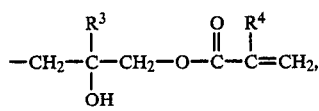

wherein $R^3$ and $R^4$ independently stand for a hydrogen atom or a methyl group, and a hydrogen atom, at least one $R^5$ stands for

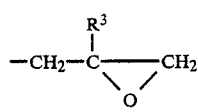

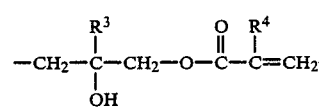

wherein $R^3$ and $R^4$ independently stand for a hydrogen atom or a methyl group, $R^6$s independently stand for an atom or an organic group selected from the group consisting of a hydrogen atom, halogen atoms, a methoxy group, and alkyl groups of 1 to 5 carbon atoms, n stands for 0 or an integer in the range of 1 to 10, and X stands for a divalent organic group selected from the class consisting of

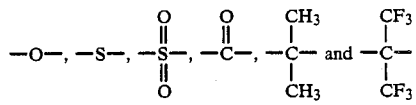

where n is 0 or X's independently stand for a divalent organic group selected from the group consisting of

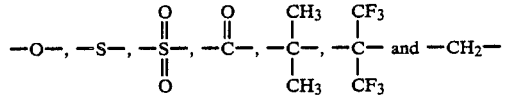

where n is an integer in the range of 1 to 10, (B) 70 to 5% by weight of a polymerizable crosslinking agent, and (C) 0.5 to 15 parts by weight, based on 100 parts by weight of a vinyl ester resin composed of (A) said unsaturated ester compound and (B) said polymerizable crosslinking agent, of a butadiene-acrylonitrile copolymer having at least one (meth)acryloyl group in the molecular unit thereof.

2. A composition according to claim 1, wherein (B) said polymerizable crosslinking agent is a styrene compound represented by the formula VII:

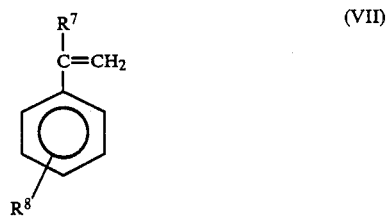

wherein $R^7$ stands for a hydrogen atom or a methyl group and $R^8$ stands for a hydrogen atom or an alkyl group of 1 to 5 carbon atoms.

3. A composition according to claim 2, wherein the symbols $R^7$ and $R^8$ in the formula representing (B) said polymerizable cross-linking agent are respectively a hydrogen atom and a methyl group.

4. A composition according to claim 1, wherein (C) said butadiene-acrylonitrile copolymer having at least one (meth)acryloyl group in the molecular unit thereof is a butadiene-acrylonitrile copolymer-modified unsaturated ester compound produced by allowing a butadiene-acrylonitrile copolymer containing at least one group selected from the group consisting of a carboxyl group and an amino group to take the place of part of (meth)acrylic acid in the reaction between the (meth)acrylic acid and an epoxy compound obtained by causing chemical addition of (d) an epihalohydrin represented by the formula VI:

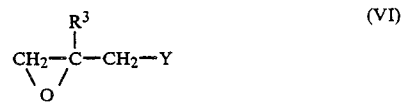

wherein $R^3$ stands for a hydrogen atom or a methyl group and Y stands for a halogen atom, to (a) an aromatic polyamine represented by the formula III:

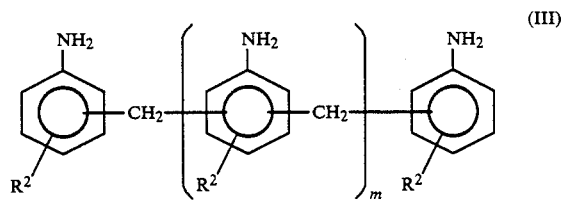

wherein R²s independently stand for an atom or an organic group selected from the group consisting of a hydrogen atom, halogen atoms, a methoxy group, and alkyl groups of 1 to 5 carbon atoms and m stands for 0 or integer in the range of 1 to 10, or (b) an aromatic diamine represented by the formula IV:

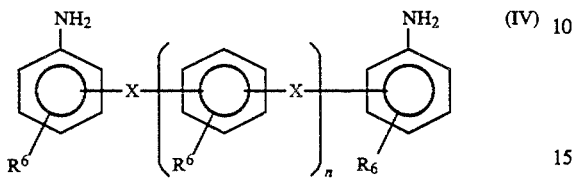

wherein R⁶s independently stand for an atom or an organic group selected from the group consisting of a hydrogen atom, halogen atoms, a methoxy group, and alkyl groups of 1 to 5 carbon atoms, n stands for 0 or an integer in the range of 1 to 10, and X stands for a divalent organic group selected from the group consisting of

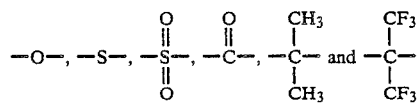

where n is 0 or X's independently stand for a divalent organic group selected from the group consisting of

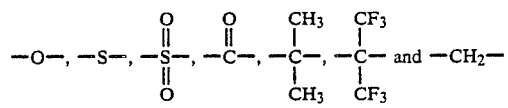

where n is an integer in the range of 1 to 10, thereby preparing a N-halohydrin as an intermediate and subjecting said N-halohydrin to dehydrohalogenation with an alkali for impartation thereto of a glycidyl group.

5. A composition according to claim 1, wherein (C) said butadiene-acrylonitrile copolymer having at least one (meth)acryloyl group in the molecular unit thereof is a butadiene-acrylonitrile copolymer-modified unsaturated ester compound obtained by causing a maleated butadiene-acrylonitrile copolymer to react with (A) unsaturated ester compounds thereby effecting ring-opening addition of at least one group selected from the group consisting of a hydroxyl group and an amino group contained in (A) said unsaturated ester compound to a succinic anhydride group contained in said maleated butadiene-acrylonitrile copolymer.

6. A composition according to claim 1, which comprises 100 parts by weight of said vinyl ester resin composed of (A) 45 to 80% by weight of said unsaturated ester compound and (B) 55 to 20% by weight of said polymerizable crosslinking agent and (C) 1 to 10 parts by weight of said butadiene-acrylonitrile copolymer.

7. A composite resin composition comprising a resin composition according to claim 1 and a reinforcing material.

* * * * *